United States Patent [19]
Cushing

[11] 3,759,097
[45] Sept. 18, 1973

[54] ELECTROMAGNETIC WATER CURRENT METER

[76] Inventor: Vincent J. Cushing, 9804 Hillridge Dr., Kensington, Md.

[22] Filed: Sept. 1, 1970

[21] Appl. No.: 68,674

[52] U.S. Cl. .............................. 73/194 EM, 73/181
[51] Int. Cl. ............................................. G01p 5/08
[58] Field of Search ................ 73/194 EM, 181, 189

[56] References Cited
UNITED STATES PATENTS

| | | | |
|---|---|---|---|
| 2,808,723 | 10/1957 | Buntenbach | 73/194 EM |
| 3,329,018 | 7/1967 | Hognestad | 73/194 EM |
| 2,969,673 | 1/1961 | Snyder et al. | 73/194 EM X |
| 3,110,876 | 11/1963 | Ramey et al. | 73/194 EM X |
| 3,114,260 | 12/1963 | Soller et al. | 73/194 EM X |
| 3,161,047 | 12/1964 | Griswold | 73/194 EM X |
| 3,503,258 | 3/1970 | Baker | 73/194 EM |
| 3,550,446 | 12/1970 | Tucker et al. | 73/194 EM |

*Primary Examiner*—Charles A. Ruehl
*Attorney*—Snyder and Butrum

[57] ABSTRACT

A body means of electrically non-conductive material supports at least one pair of electrically conductive detecting electrodes disposed at opposite portions of the body means. Means is supported within the body means between the electrodes for producing an alternating magnetic field. An electrical circuit is connected to the detecting electrodes and includes indicating means. In one form of the invention, electrically conductive guard means is disposed adjacent the electrodes and means is provided for establishing a potential on the guard means which is directly proportional to the potential on the detecting electrodes. In another form of the invention, means is provided for driving the electomagnet to produce an alternating magnetic field at a predetermined frequency wherein the magnetic field is driven to a finite value for a predetermined time interval during each cycle, and the electrical circuit includes means for measuring the signal from the detecting electrodes during a time delayed portion of said time interval. In a further form of the invention, pairs of oppositely disposed detecting electrodes are provided at right angles to one another so as to indicate the direction of water current flow. In each form of the invention, shield means is preferably employed in the form of electrically conductive material disposed between the detecting electrodes and the means for producing the magnetic field.

18 Claims, 19 Drawing Figures

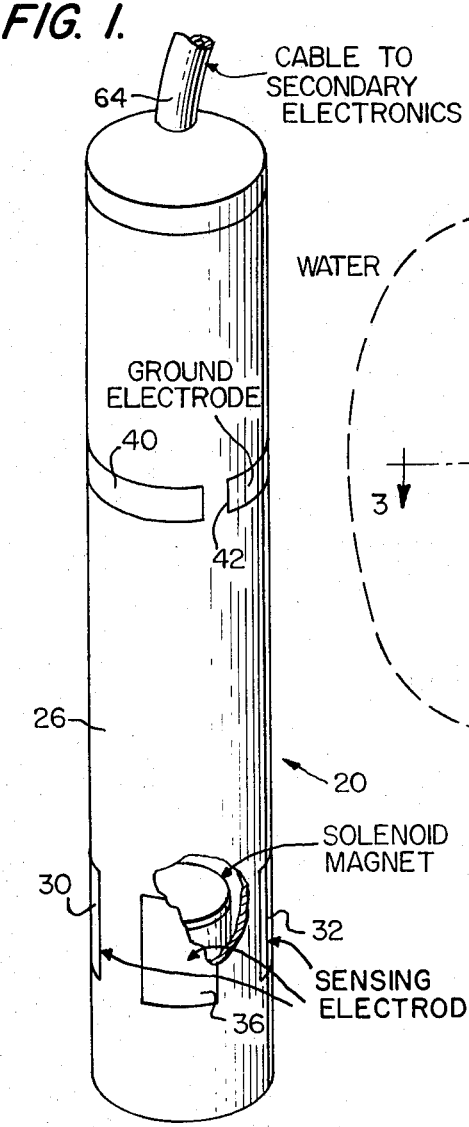
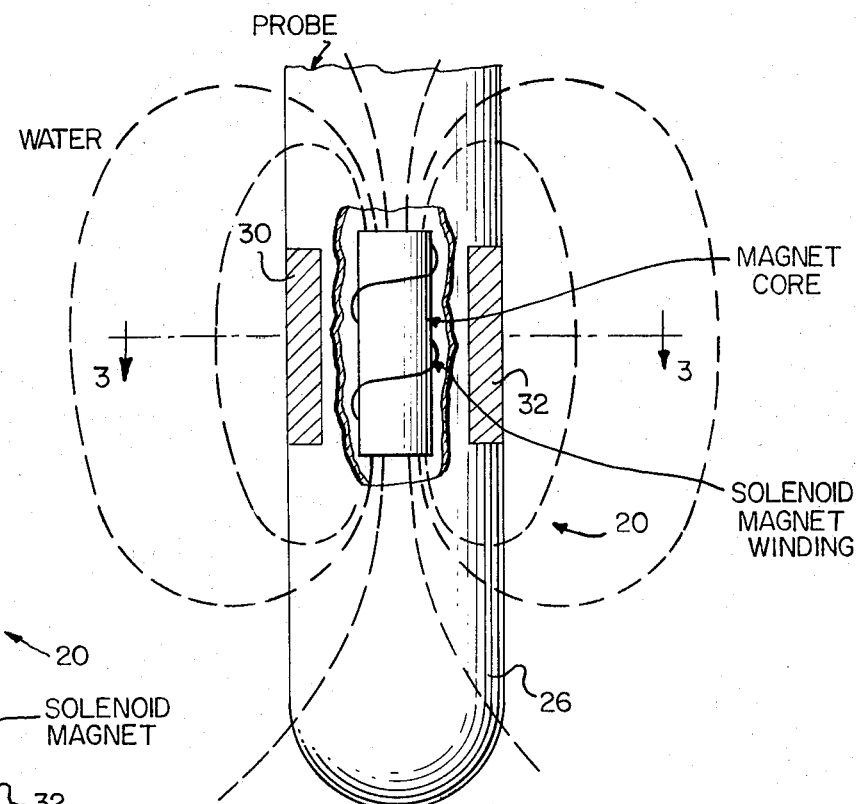
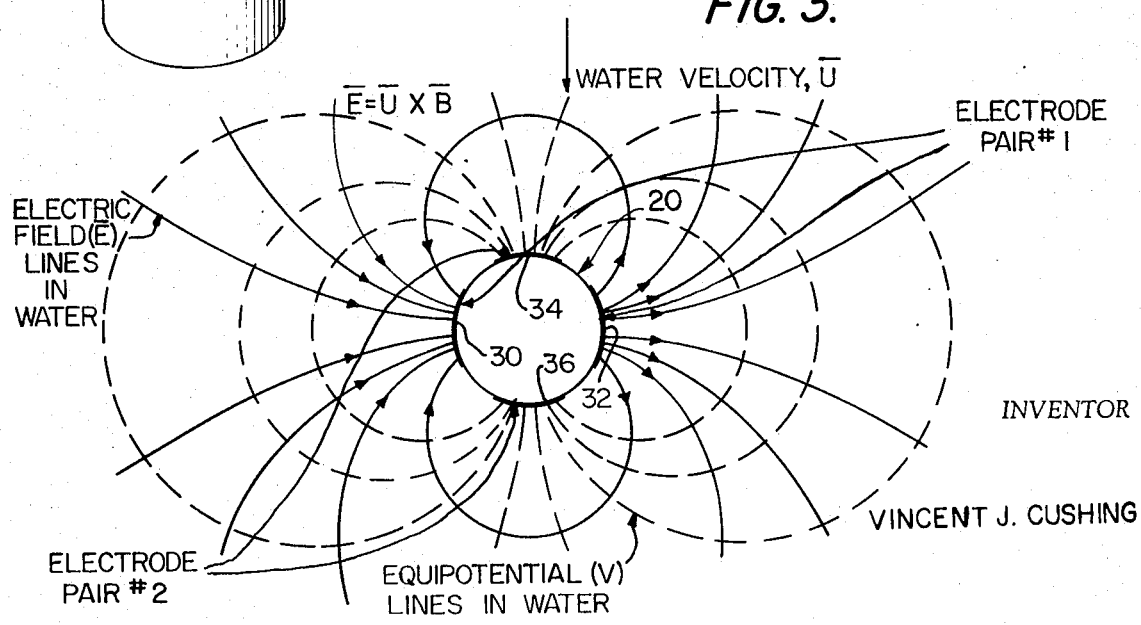
INVENTOR
VINCENT J. CUSHING

INVENTOR
VINCENT J. CUSHING

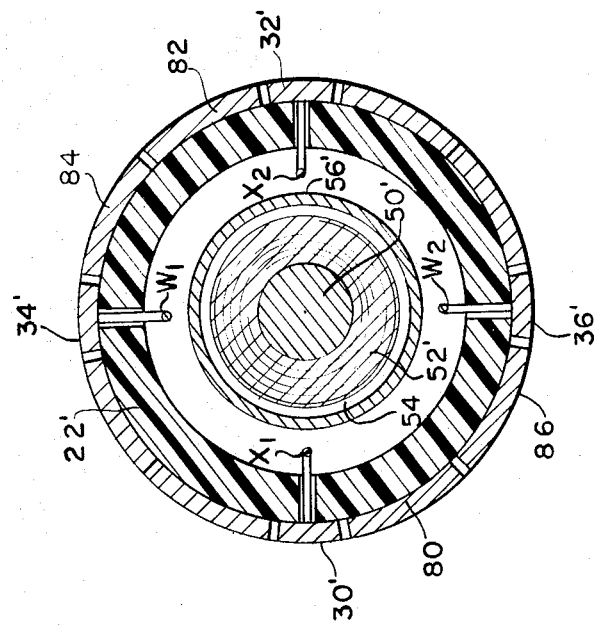
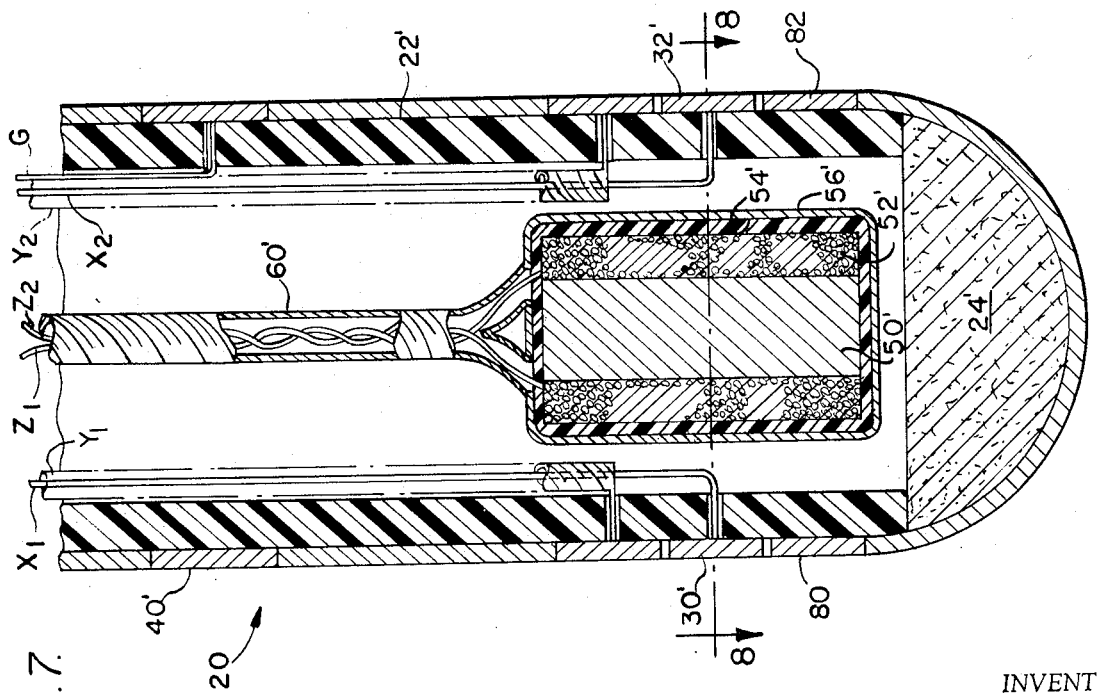
INVENTOR
VINCENT J. CUSHING

Patented Sept. 18, 1973

INVENTOR
VINCENT J. CUSHING

INVENTOR
VINCENT J. CUSHING

INVENTOR
VINCENT J. CUSHING

Patented Sept. 18, 1973

INVENTOR
VINCENT J. CUSHING

ELECTROMAGNETIC WATER CURRENT METER

BACKGROUND OF THE INVENTION

The present invention is directed to an instrument capable of very accurate measurement of the magnitude of water current as well as the direction thereof. It is useful for measuring water currents in the ocean, estuaries, tidal waters, rivers and lakes. It may also be used to measure the flow of water in aqueducts, sewers, sluices and flumes. Such an instrument should be linear so that it may be employed for frequency analysis of water currents and in separating the steady and alternating components of water flow as, for example, the measurement of water flow near the surface where surface waves superpose orbital water velocities on the otherwise steady movement of water.

A water current meter may be employed in fresh, brackish or salt water, and accordingly the instrument should be insensitive to the electrical conductivity of the metered water so that its meter factor is the same in various types of water. Known water current meters are sensitive to the conductivity of the metered water whereby the meter factor is not constant in different kinds of water. For example, the zero-point or base line moves around depending on the conductivity of the metered water and this movement of the base line or zero-point generally changes with time due to the so-called electrochemical aging effects at the interface between the instrument and water.

It is desirable to not only measure the magnitude of the water current but also the direction thereof. In the past, water current meters have not successfully detected the direction of the water current where the magnitude and direction of the water current change with time.

Almost all ocean current measuring devices have employed a mechanical impeller or propeller which suffers from a number of drawbacks. The output of such meters is a non-linear function of water velocity and the output is sensitive to the speed of water movement regardless of the direction thereof. Additionally, such a construction is very much subject to marine fouling so that the meter factor can be trusted only for about 12 to 24 hours of immersion.

Fouling generally consists of the accretion of a thin layer of marine organisms on the surface of the instrument. The electrical characteristics of these organisms may be such as to alter the signal voltage thereby causing the meter to be inaccurate in operation.

In all electromagnetic velocity meters, either an alternating or a steady magnetic field may be used to develop the voltage. However, the electrical noise associated with electrode electrochemical polarization is very rich in the low frequency end of the spectrum. At zero frequency when employing a steady magnetic field, the polarization voltage is orders of magnitude larger than the flow induced voltage, and accordingly alternating magnetic induction is employed.

Alternating induction goes a long way toward solving the electropolarization problem, but it introduces a "transformer effect" noise voltage since the alternating flux threads various circuit loops in the transducer circuitry. This noise is at the same frequency as the signal produced due to the water current, although it is 90° out of phase. A phase-sensitive detector can in principle reject this "transformer effect" voltage if it works perfectly, and if there are no substantial phase-shifting mechanisms in the overall transducer circuitry, including that portion of the circuitry which passes through the metered water. Unfortunately, such is not the case, and the phase-sensitive detector does not function in a perfect manner.

It is also desirable to substantially eliminate the various spurious voltages which are in phase with the signal generated by the water current and which are indistinguishable from the water current signal. These voltages have been permitted to exist in the prior art and variation in these spurious voltages with time causes a concomitant variation in the zero-point of the instrument. Accordingly, the measurements obtained by the meter are inaccurate by the amount the base line drifts from time to time.

The voltage applied to the electromagnet in an alternating induction water current meter in a practical instrument is on the order of several volts. The signal voltage generated by water motion may be on the order of 100 microvolts. If the base line is to be held steady, no spurious voltages on the order of perhaps 1 microvolt to 0.1 microvolt can be spuriously generated in the water or in the signal sensing circuitry. If only one part in ten million or one part in one hundred million of the magnet voltage is permitted to leak into the signal circuitry, the base line of the overall instrument may move around intolerably. It is therefore of fundamental importance that all voltages associated with the electromagnet be shielded so that there is substantially zero electrical admittance between the electromagnet circuitry and the water current sensing circuitry.

In electromagnetic water current meters, a very serious phaseshifting mechanism is due to the time-dependent electrochemical effects at the interface between the detecting electrodes and the water. There is, in effect, a very large capacitance due to electrochemical effects at the interface between the electrodes and the water. This capacitance coupled with the resistance of the water and/or the resistance of the electrode itself is a serious phase-shifting mechanism that shifts the "transformer effect" voltage partially so that it becomes indistinguishable from the signal voltage produced by water flow. Electromagnetic water current meters heretofore have employed a sinusoidal alternation in the magnetic induction. This electrochemical phase-shifting mechanism shifts part of the "transformer effect" voltage by 90° so that it is sensed by the signal sensing circuitry which, of course, is very undesirable.

For a given phase-shifting mechanism, such as the electrochemical phase-shifting mechanism at the electrode-water interface, a sinusoid is perhaps the poorest form of alternation to be employed. In other words, the signal sensing circuitry is most sensitive to the phase-shifting mechanisms when a sinusoidal alternating magnetic induction is employed.

SUMMARY OF THE INVENTION

In the present invention, a body means of electrically non-conductive material is provided and a pair of electrically conductive electrodes are supported by the body means at opposite portions thereof. Means such as an electromagnet is supported within the body means and between the electrodes for producing an alternating magnetic field. The detecting electrodes are connected with an electrical circuit including indicating means for measuring the water current.

In one form of the invention, guard means is supported by the body means adjacent the electrodes and is insulated therefrom. The electrical circuit is connected with the guard means for establishing a potential on the guard means which is substantially directly proportional to the potential on the detecting electrodes and which is preferably at substantially the same potential.

This guard arrangement is particularly suited for overcoming the fouling problem. By driving the guard means or electrodes such that they are substantially at the same signal potential as the detecting electrodes, the overall flow induced voltage is restored to its correct value which makes the overall instrument less susceptible to the effects of fouling.

This guard arrangement is additionally useful when the detecting electrodes and the guard means are not in direct contact with water but are separated therefrom by a sleeve formed of electrical insulating material. This sleeve may also contain toxins for preventing marine fouling.

In another form of the invention, the means for producing the alternating magnetic field includes an electromagnet along with means for driving the electromagnet to produce an alternating magnetic field at a predetermined frequency wherein the magnetic field is driven to a finite value for a predetermined time interval during each cycle. The electrical circuit in this form of the invention includes means for measuring the output signal from the detecting electrodes during a delayed portion of the time interval whereby "transformer effect" voltage is substantially eliminated.

This construction employs a drive means which produces a rectangular or square wave output. This drive means produces a magnetic alternation wherein the time rate of change of the magnetic induction is zero for a substantial portion of the period of alternation.

The electrical circuit is such that the sensing electronics remains gated closed while the magnetic induction is changing and for an additional length of time thereafter to permit transients to die out whereupon the sensing electronics is gated open during the latter portions of the interval when the time rate of change of the magnetic induction is zero.

The electromagnet as well as the leads thereto is substantially fully shielded from the detecting electrodes and the electrical circuit associated therewith so as to eliminate causes of base line drift in the overall water current metering instrument.

In still another form of the invention wherein it is desired to measure not only the magnitude but the direction of flow of the water current, two pairs of detecting electrodes are employed, each pair being disposed at substantially opposite sides of the body means, the two pairs of electrodes being disposed at right angles to one another. These two pairs of electrodes enable the measurement of two vector components of the current flow enabling the direction of flow to be readily determined. The meter is capable of continuous measurement of the vector components of water current even though the magnitude and direction of water current may be changing with time.

The meter of the present invention has no moving parts and has a substantially zero threshhold. It is capable of measuring both the magnitude as well as the vector components of water current. The instrument is useful for metering fresh or salt water and may also be employed in other applications with any adequately conducting liquid. The form of the invention employing the guard means may also be employed for metering either conductive or dielectric liquids.

BRIEF DESCRIPTION OF THE DRAWINGS

FIG. 1 is a top perspective view partially broken away illustrating a first form of the invention;

FIG. 2 is an enlarged view of the lower end of the device shown in FIG. 1 and partially broken away for the purpose of illustration;

FIG. 3 is a sectional view taken substantially along line 3—3 of FIG. 2 looking in the direction of the arrows;

FIG. 7 is a sectional view similar to FIG. 5 illustrating a modified form of the invention;

FIG. 8 is a sectional view taken substantially along line 8—8 of FIG. 7 looking in the direction of the arrows;

DESCRIPTION OF THE PREFERRED EMBODIMENTS

Figure 4:
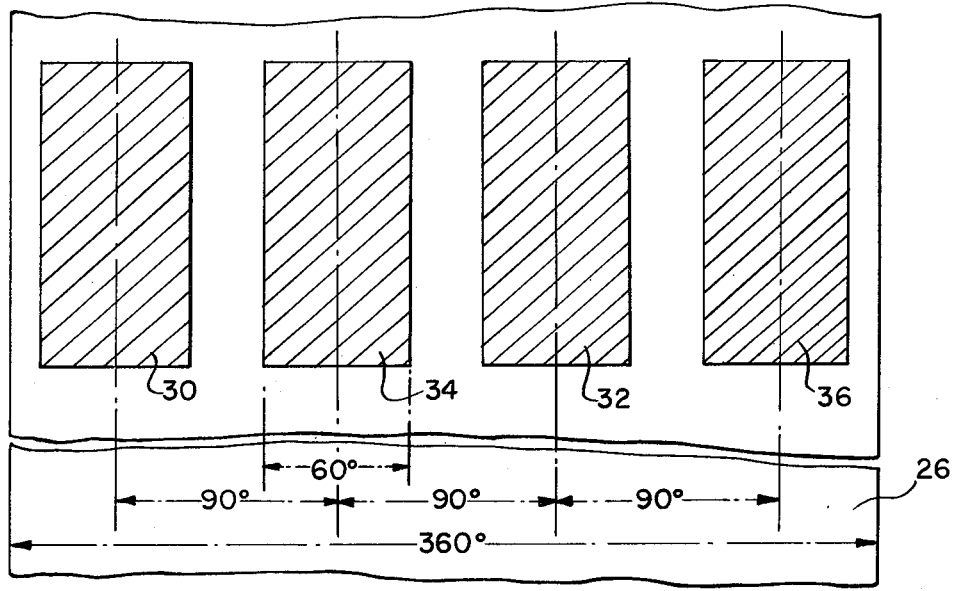
FIG. 4 is a flattened view of the surface of the meter adjacent the sensing electrodes.

Referring now to the drawings wherein like reference characters designate corresponding parts throughout the several views, a first embodiment of the invention is illustrated in FIGS. 1-6, inclusive. The meter includes a transducer portion indicated generally by reference numeral 20 comprising a cylindrical body means 22 formed of a relatively rigid electrically non-conductive material such as fiberglass or the like. The body means includes an end portion 24 which closes off the end of the body means. The exterior of the body means is covered by a coating 26 formed of non-conductive anti-fouling paint or the like which inhibits fouling of the apparatus. It will be noted that the transducer portion of the meter is generally cylindrical and includes a rounded lower end to minimize disturbances to the water velocity profile in th neighborhood of the transducer.

Figure 5:
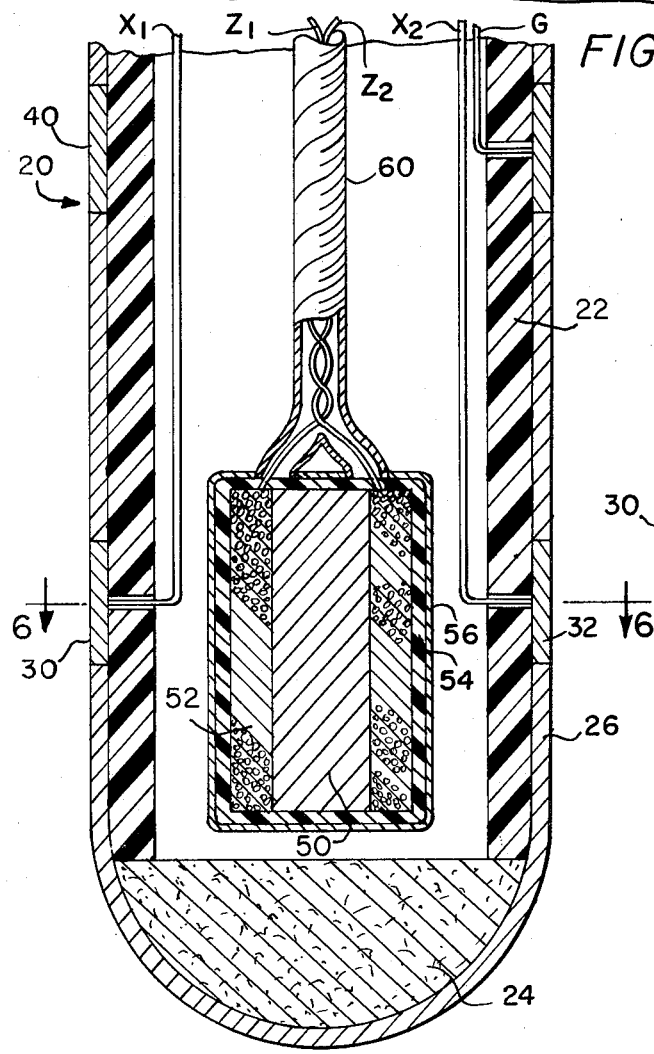
FIG. 5 is an enlarged vertical section through the meter shown in FIG. 1.

As seen in FIG. 5, a first pair of detecting electrodes 30 and 32 are supported on the outer surface of the body means at substantially diametrically opposite portions thereof. Each of these detecting electrodes is substantially rectangular in configuration as seen in FIG. 4, the detecting electrodes being formed of a suitable electrically conductive material such as a conductive mixture of anti-fouling paint and carbon. The detecting electrodes 30 and 32 are connected with suitable leads $X_1$ and $X_2$ respectively, these leads extending through holes provided in the wall of body means 22.

A second pair of detecting electrodes 34 and 36 are supported on the outer surface of the body means and are disposed at substantially diametrically opposite portions thereof. The electrodes of the two pairs of detecting electrodes are disposed at 90° intervals from one another as can be seen most clearly in FIGS. 4 and 6. Electrodes 34 and 36 are connected with leads $W_1$ and $W_2$ which also extend through holes provided in the body means. The leads connected with the detecting electrodes are in turn connected with an electrical circuit hereinafter described.

A ground electrode 40 of generally annular configuration is supported on the outer surface of the body means. This ground electrode is formed of an electrically conductive material and includes a gap 42 in one portion thereof so as to prevent the deleterious effect of a completely short circuited loop. A lead G is connected to the ground electrode and extends through a suitable hole provided in the wall of the body means. This lead is in turn connected to instrument ground.

A means for producing an alternating magnetic field is disposed within the body means and between the detecting electrodes. This means comprises an electromagnet having a core 50 and a coil winding 52 disposed therearound, this coil winding in turn being connected with suitable leads $Z_1$ and $Z_2$ extending to a portion of an electrical circuit hereinafter described. The electromagnet is of a generally eddyless construction including a core formed of ferrite material which substantially eliminates eddy currents. For low frequencies of alternating magnetic induction such as 30 Hz, it is satisfactory to wind the coil with ordinary copper wire. If high frequency induction is used such as 1kHz or above, then eddy current production in the coil wire itself may be dilatorious and instead of employing copper wire, Litz wire may be employed in the coil.

The coil is potted so as to provide a body 54 of insulating material around the coil. A thin layer 56 of electrically conductive material such as silver paint is provided on the outer surface of insulation 54 to serve as a shield for shielding the electromagnet from the detecting electodes. If the frequency of magnetic alternation is sufficiently low such as 30Hz, silver conductive paint may be employed and eddy currents produced in such a conductive paint are tolerable at this low frequency. On the other hand, if the frequency is large, such as 1 kHz, eddy current production in the conductive layer 56 may become intolerable and a conductive surface of less conductivity such as carbon conductive paint may be employed.

Leads $Z_1$ and $Z_2$ are a shielded twisted pair of wires having a cylindrical shield 60 of electrically conductive material disposed in surrounding relationship thereto. This shield 60 is faired into layer 56 so that all large voltages associated with the electromagnet, whether they be on the coil windings themselves or on the twisted pair of lead wires, are thoroughly shielded from the signal detection circuitry including the water in contact with the detecting electrodes. This overall shielding of the magnet circuitry must be thorough to the extent that the electrical admittance between the magnet circuitry and the detection circuitry, including the water in contact with the detection electrodes, is negligible compared with the electrical admittance between the detecting electrodes and instrument ground.

Figure 6:
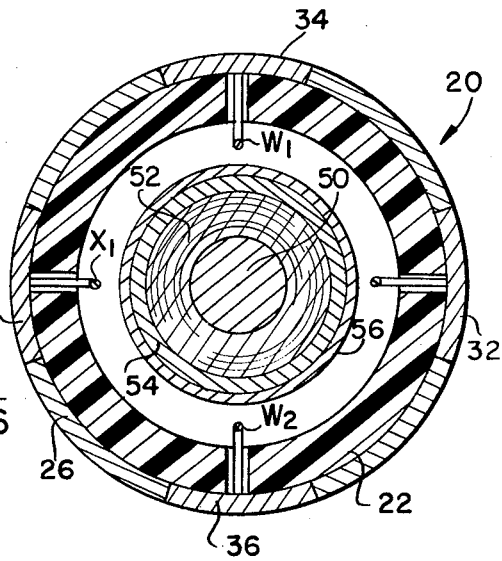
FIG. 6 is a sectional view taken substantially along line 6—6 of FIG. 5 looking in the direction of the arrows.
Figure 12:
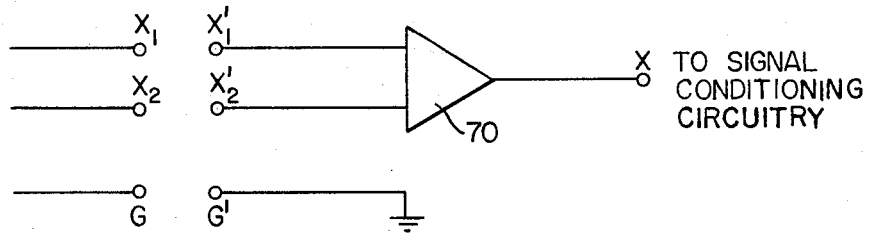
FIG. 12 is a schematic illustration of an electrical circuit which is adapted to be employed with the embodiment shown in FIGS. 1-6, inclusive.

It will be noted that the sensing portion of the meter is disposed near one end of the transducer portion, while the signal conditioning electronics or a portion thereof is separated from the sensing portion so that the amount of the alternating magnetic induction which threads the signal conditioning circuitry is at a minimum since spurious voltages generated thereby could be troublesome. Accordingly, the signal conditioning electronics may be disposed at the opposite end of the transducer portion of the apparatus or it may be preferably disposed in a separate secondary unit at a substantial distance from the transducer portion of the apparatus and connected thereto by a suitable underwater cable or transmission line 64 as seen in FIG. 1. As seen in FIG. 12, the two leads $X_1$ and $X_2$ are adapted to be connected to two leads $X'_1$ and $X'_2$ respectively, which are in turn connected to a differential amplifier the output of which is connected with suitable signal conditioning circuitry. Lead G, previously described, is connected with lead G' which in turn is connected to ground. It should be understood that each pair of electrodes is connected to a separate differential amplifier, and accordingly a further differential amplifier similar to amplifier 70 would be connected with the leads $W_1$ and $W_2$ as seen in FIG. 6 of the drawings.

Referring now to FIG. 2 of the drawings, the electromagnet produces something like a dipole magnetic induction which passes out through the metered water. The magnetic field is indicated by the dashed lines as shown in this figure. Motion of the water through this alternating magnetic field induces an alternating electric field in the water, this electric field in turn being sensed by the detecting electrodes.

The first pair of detecting electrodes 30 and 32 senses a voltage which is directly proportional to the component of water flow perpendicular to the plane of this figure. The second pair of detecting electrodes disposed at right angles to the first mentioned pair of detecting electrodes senses a voltage which is directly proportional to the component of the water flow parallel to the plane of FIG. 2.

The windings of the electromagnet are energized by an alternating voltage that is large compared with the voltage induced in the water due to water motion. FIG. 3 illustrates the electric potential field induced by the water motion. For a water velocity in the direction as indicated by the arrow in this figure, the induced electric field is indicated by the solid lines. The lines of constant induced potential in the water are indicated by the dotted lines. Electrodes 30 and 32 sense the electric field developed by the water moving in the direction of the arrow in this figure whereas electrodes 34 and 36 will sense a zero voltage since the component of water flow velocity perpendicular to the line connecting these latter two electrodes is zero. Each pair of detecting electrodes senses a voltage whose waveshape is identical to that of the alternating magnetic induction.

Because of the symmetry of the magnetic induction field, the arrangement as shown in FIGS. 1–6 senses the two water velocity components perpendicular to the axis of the circular cylinder. The device is insensitive to the component of water flow parallel to the axis of the cylinder.

This form of the invention is capable of measuring the two vector components of water velocity which are perpendicular to the axis of the transducer. If it is desired to measure only one of these vector components of water velocity, one of the pairs of electrodes shown in FIG. 6 may be eliminated. In this case, the area where the electrodes are eliminated would be covered by anti-fouling paint since the exterior of the body means is fully covered with anti-fouling paint except for the electrode areas to minimize the growth of marine fouling.

If only one pair of electrodes is employed, the cross section of the transducer should be modified to provide a hydrofoil or eliptical cross section. The detecting electrodes would be placed on opposite sides of the minor axis of such an elipse. This type of configuration is more streamlined and minimizes the disturbance of the water flow due to flow separation and the generation of eddies. A streamlined version of the meter employing a single pair of electrodes can operate satisfactorily with greater water velocity.

Figure 9:
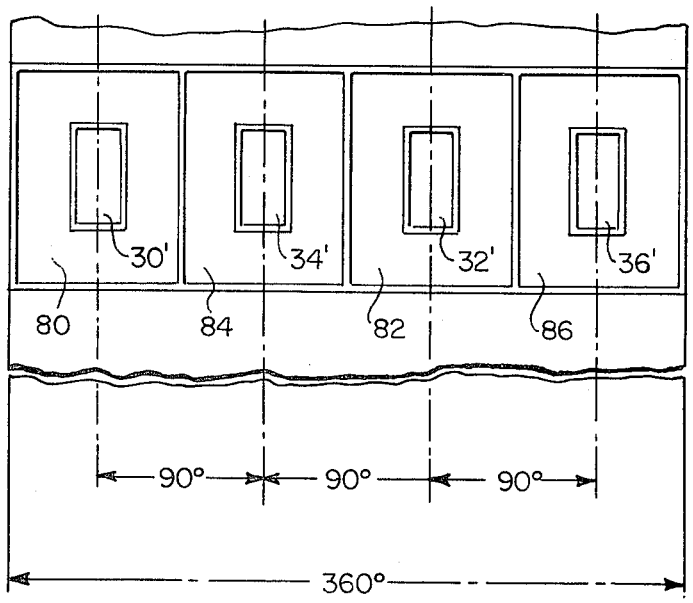
FIG. 9 is a flattened view of the outer surface of the meter adjacent the detecting electrodes and the associated guard means.

Referring now to FIGS. 7–9 inclusive of the drawings, a modified form of the invention is illustrated. This construction is similar to that previously described, the only difference being that each of the detecting electrodes in this form of the invention is surrounded by a guard electrode. The components in this form of the invention, similar to those previously described have been given the same reference numeral primed. As seen most clearly in FIG. 9, detecting electrodes 30', 34', 32' and 36' are surrounded by guard electrodes 80, 84, 82 and 86 respectively, each of these guard electrodes being substantially rectangular in configuration and including a central aperture which receives the associated detecting electrode and provides an insulating gap between the detecting electrode and the adjacent guard electrode. Each of the guard electrodes is formed of a suitable electrically conductive material.

The leads $X_1$ and $X_2$ to the detecting electrodes correspond to the similar leads in the previously described embodiment of the invention. Leads $Y_1$ and $Y_2$ are connected to guard electrodes 80 and 82 respectively, as seen in FIG. 7, these leads being of tubular construction and being disposed in spaced surrounding relationship to leads $X_1$ and $X_2$ so as to shield these latter mentioned leads. Leads $Y_1$ and $Y_2$ are connected to the associated guard electrodes through suitable holes provided in the body means.

Figure 13:
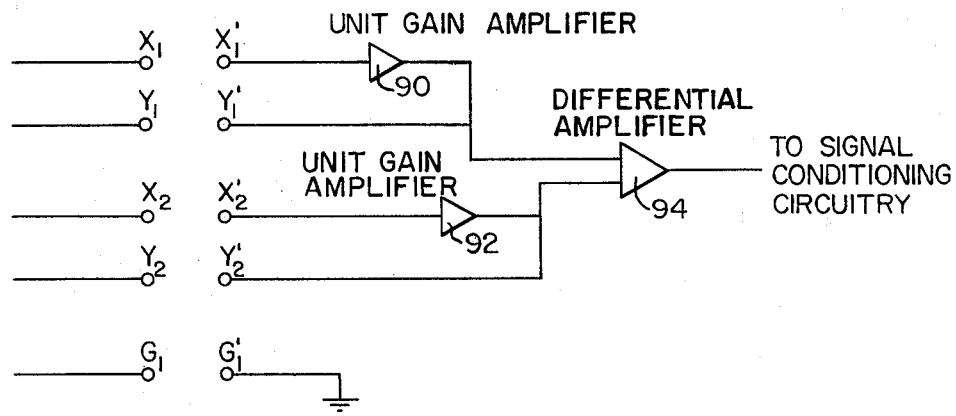
FIG. 13 is a schematic illustration of an electrical circuit adapted to be employed with the embodiment as shown, for example, in FIGS. 7-11, inclusive.

Referring now to FIG. 13, an electrical circuit is indicated wherein the leads indicated in FIG. 7 are connected to the leads having corresponding reference characters primed. It will be noted that the leads $X_1$ and $X_2$ are connected with the input of unit gain preamplifiers 90 and 92 the outputs of which are each connected to a differential amplifier 94. The output of this differential amplifier is in turn connected with suitable signal conditioning circuitry hereinafter described.

The output of preamplifier 90 is connected to lead $Y_1$ while the output of preamplifier 92 is connected to lead $Y_2$. With this arrangement, the entire shield on the transmission line as well as on the guard electrode to which the shield is electrically connected is at the same flow generated potential as the detecting electrodes.

The guard means or guard electrodes serve to establish a potential in the neighborhood of the detecting electrode which is directly proportional to the potential on the detecting electrode. The best constant of proportionality is unity so that the guard electrode is driven at the same flow generated potential as the detecting electrode. Other constants of proportionality may be employed simply by using something other than a unit gain preamplifier. In an extreme case, the constant of proportionality may be zero whereby the guard electrode may be connected to instrument ground and preamplifiers 90 and 92 may be eliminated.

The construction shown in FIGS. 7–9 is adapted to measure two vector components of water velocity. The circuitry shown in FIG. 13 is adapted to be connected with one set of detecting electrodes, it being understood that an identical duplicate set of preamplifiers and an associated differential amplifier would necessarily be connected with the second set of detecting electrodes. If it is only desired to measure one vector component of water velocity, one pair of electrodes and the corresponding electrical circuitry may be eliminated. If this is done, the cross-sectional configuration of the device would be altered to provide a more streamlined configuration, as discussed hereinbefore.

Figure 10:
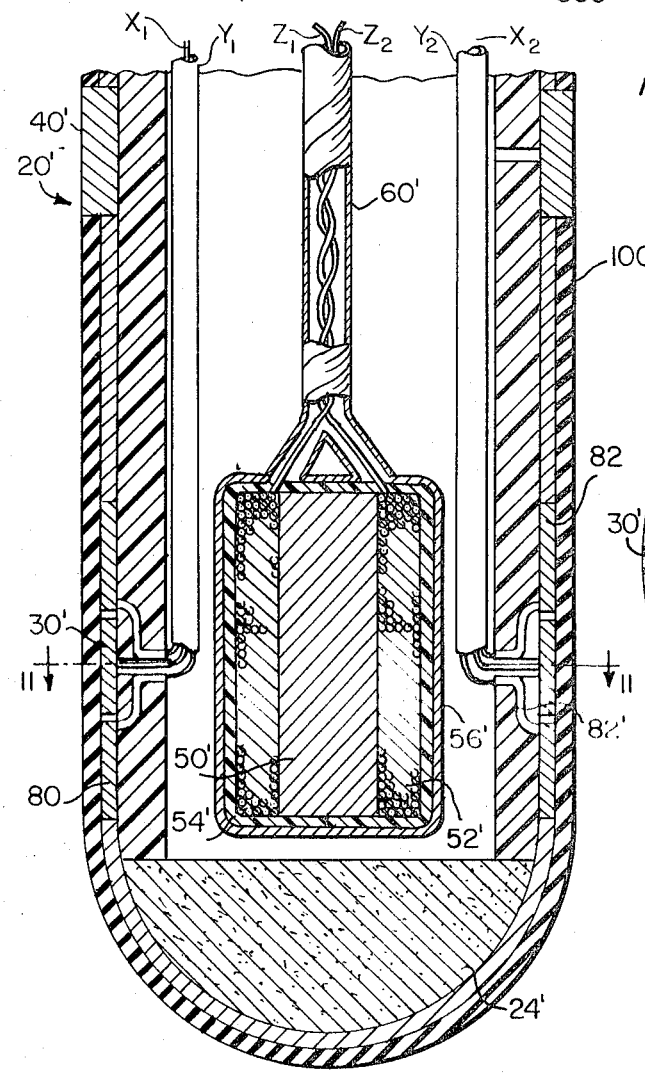
FIG. 10 is a vertical longitudinal section through still another form of the invention.
Figure 11:
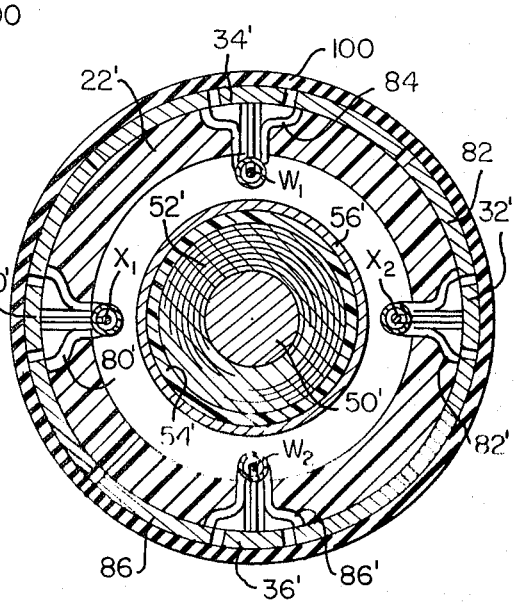
FIG. 11 is a sectional view taken substantially along line 11—11 of FIG. 10 looking in the direction of the arrows.

Referring now to FIGS. 10 and 11, still another form of the invention is illustrated. This form of the invention is similar to that shown in FIGS. 7–9 inclusive, and identical parts have been given the same reference characters in FIGS. 10 and 11 as applied to the components shown in FIGS. 7–9. In this latter modification of the invention, the entire transducer is surrounded by a sleeve 100 which is formed of a suitable, preferably dielectric, material. In this way, the detecting electrodes as well as the guard electrodes and the ground electrode are all prevented from being in direct contact with the metered water. This sleeve may be made of a material with excellent toxic properties so as to eliminate or minimize marine fouling and it may be of a material to minimize electrochemical phase-shifting mechanisms that ordinarily operate at the interface between a conductive electrode and water.

Without such a sleeve, the detecting electrode in direct contact with the metered water has a relatively low contact resistance, or in other words, it has a relatively high contact admittance. The contact admittance to the water is greatly reduced when utilizing a sleeve formed of low conductivity or dielectric material. Accordingly, the guard electrodes must be of modified construction so as not only to surround the detecting electrodes on the surface of the transducer as in the previously described modification but also to be positioned between the detecting electrodes and the inner side thereof.

As seen in FIGS. 10 and 11, guard electrodes 80, 82, 84 and 86 are provided with extended portions 80', 82', 84' and 86' respectively which are disposed inwardly of the associated detecting electrodes and which extend to the inner surface of the body means and are connected with the respective tubular leads. In the arrangement shown in FIGS. 10 and 11, the entire detecting electrodes as well as the associated signal transmission leads are completely guarded. Since the electrodes are not in direct contact with water, the electrodes may not be made from a conductive mixture of anti-fouling paint and carbon, but, on the contrary, ordinary conductive carbon paint may be used.

The various electrical leads shown in FIGS. 5, 7 and 10 are connected by means of a suitable underwater cable to a signal processing unit which is located at some remote position. Alternatively, the signal processing unit may be incorporated within an oversized transducer itself so that the unit is self-contained, including batteries for power. In the latter case, a self-contained recorder may be employed for readout at a later time.

Figure 14:
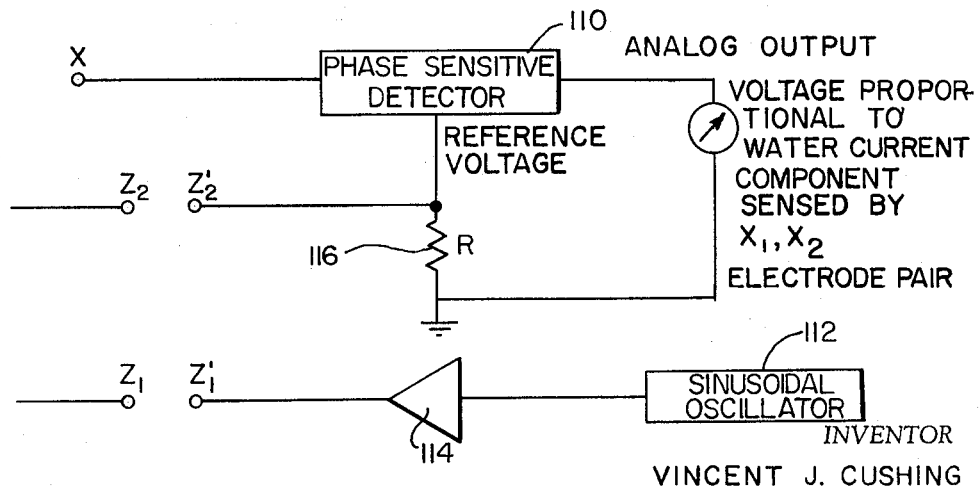
FIG. 14 is a schematic illustration of an electrical circuit adapted to be employed with the meter of the present invention if the meter is energized by a conventional sinusoidal drive.

If the electromagnet of the meter is energized by conventional sinusoidal magnet drive, a signal conditioning circuit as shown in FIG. 14 is employed, the input X to the phase-sensitive detector 110 being connected to the output of the differential amplifier of either the circuit shown in FIG. 12 or FIG. 13, as the case may be. The output of this phase-sensitive detector is an analog voltage proportional to the vector component of current sensed by a pair of detection electrodes.

An amplitude stable sinusoidal oscillator 112 energizes the power amplifier 114 so that the power amplifier's output current is amplitude stable. This power amplifier is connected with one of the leads $Z_1$ to the electromagnet, the other of the leads $Z_2$ of the electromagnet being connected to instrument ground through a small resistor 116. This resistor develops a voltage which is in phase with the electromagnet current and which is used as the reference voltage for the phase-sensitive detector. The system is sensitive to voltage which is in phase with the magnetic induction, or, in other words, is sensitive to the voltage developed by the water current and is insensitive to quadrature voltage which is proportional to the time rate of change of the magnetic induction, i.e., the so-called "transformer effect" voltage.

Figure 15:
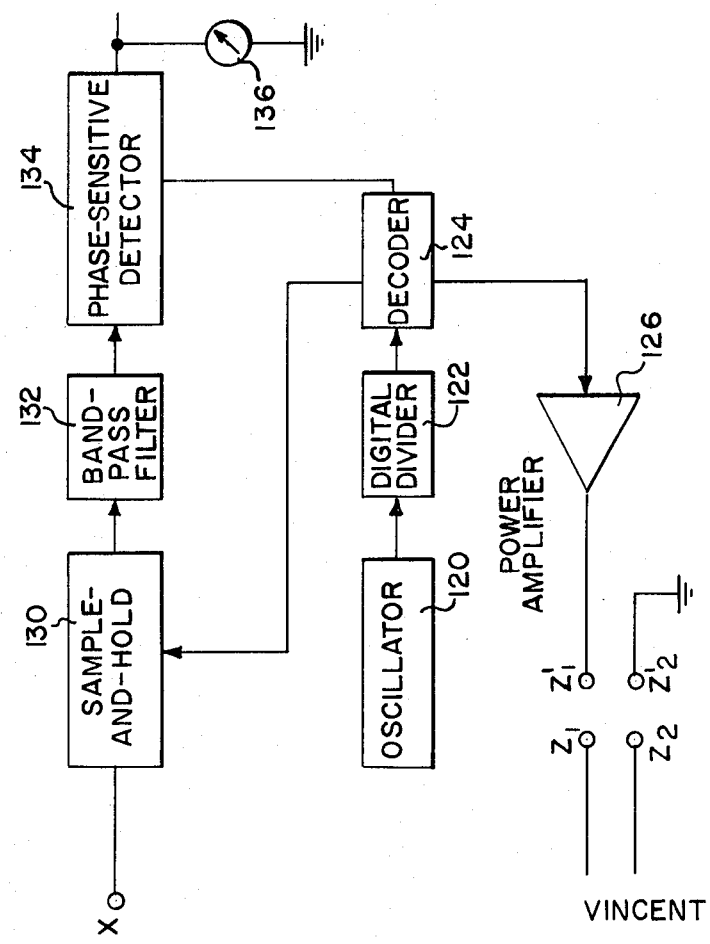
FIG. 15 is a schematic illustration of an electrical circuit of still another form of the invention wherein the drive means for the electromagnet produces a rectangular output voltage.

Referring now to FIG. 15 of the drawings, a further modified form of the invention is illustrated which is especially adapted to minimize the deleterious effects of various phase-shifting mechanisms or time delaying mechanisms such as the electrochemical phase-shifting mechanism at the electrode-water interface discussed hereinbefore.

An oscillator 120 operates at some multiple of the desired operating frequency. The output of this oscillator is connected with a digital divider, the output of which provides the desired operating frequency and also the waveforms necessary to operate the remainder of the signal conditioning circuitry. The output of the digital divider is connected with a decoder 124.

Figure 16:
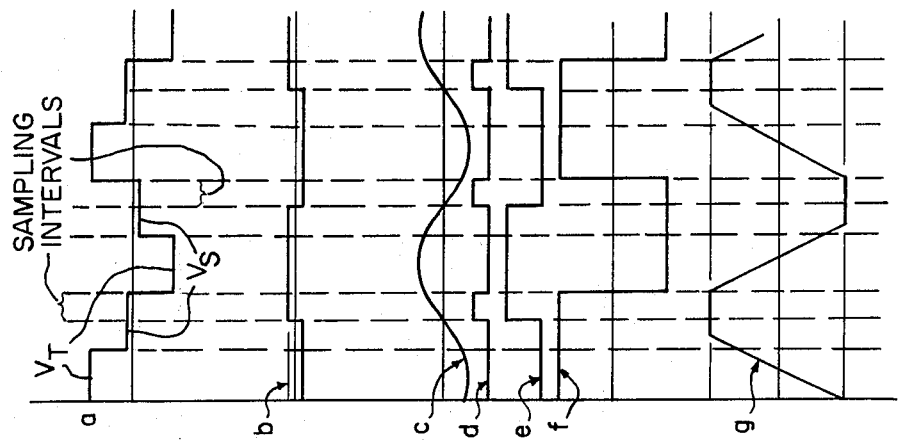
FIG. 16 is a waveform and timing diagram for the circuit shown in FIG. 15.

A the output of the decoder 124 which is fed to tYe input of a power amplifier 126 has a current waveform as illustrated in FIG. 16f. This is a rectangular or square wave voltage. The output of the power amplifier is connected to leads $Z_1$ and $Z_2$ connected with the electromagnet. Since the electromagnet is an inductive load, it is unable to faithfully follow the waveform of the input voltage to the power amplifier, and accordingly the output current waveform of the power amplifier is illustrated in FIG. 16g. The important thing to note is that this output waveform of the power amplifier includes a portion of the square wave input waveform wherein the current or voltage is not changed with time during each half cycle of the alternation.

Since the magnetic induction is directly proportional to the current passing through the electromagnet, means is provided for driving the electromagnet to produce an alternating magnetic field at a predetermined frequency wherein the magnetic field is driven to a finite value for a predetermined time interval during each half cycle of operation.

A conventional sample-and-hold gate 130 is connected with the output of one of the differential amplifiers as previously described. The voltage waveform appearing at the input of the sample-and-hold circuit is indicated in FIG. 16a. The large portions of the voltage waveform labeled $V_t$ are due to "transformer effect" and they represent large voltages generated while the magnetic field is changing. When the magnetic field is not changing, the "transformer effect" voltage substantially disappears and only the signal voltage $V_S$ as shown in FIG. 16a remains. During this portion of the alternation, the sample-and-hold gate may be opened to admit the flow signal. However, phase-shifting mechanisms or time-delay mechanisms cause a short after-effect of the large "transformer effect" voltage.

In order to eliminate virtually all of this after-effect, the gate is not opened immediately after the "transformer effect" voltage disappears, but rather an additional time delay is interposed before the signal gate is opened. The waveform from decoder 124 to the sample-and-hold gate is shown in FIG. 16d which causes the sample-and-hold circuit to be gated open only at the latter portion of each half cycle of alternation of the magnetic induction.

The advantages of sampling for a short interval toward the end of each half period of alternation of the magnetic field is that not only is the "transformer effect" voltage rejected but also any effects due to phase-shifting or time-delay mechanisms are allowed to decay to a small value. Since the "transformer effect" and its after-effects are responsible for the variation in base line of the overall instrument, this form of the invention provides much better results than the sinusoidal excitation generally used with electromagnetic water current meters.

The output of the sample-and-hold circuit is fed to a band pass filter 132, and the waveform at the output of the sample-and-hold circuit is shown in FIG. 16b. This output voltage is substantially a square wave with a peak-to-peak value proportional to the signal generated by water current. The band pass filter filters this signal so that only the fundamental sinusoidal component is retained, and the output of the band pass filter is illustrated in FIG. 16c. This sinusoidal output is then fed into a phase-sensitive detector 134.

The waveform of the signal from the decoder to the phase-sensitive detector is shown in FIG. 16e, and the final output of the phase-sensitive detector is then fed to a suitable indicating means such as a volt meter 136 connected with ground or any other suitable indicating means. The output is an analog voltage proportional to the water current components sensed by a particular pair of electrodes. It will, of course, be understood that a similar circuit can be employed with a second pair of electrodes.

The phase-sensitive detector used in this circuit is required only so that it is sensitive to the phase as well as magnitude of the signal at its input. The phase-sensitive detector's output voltage is positive for water current flow in one direction and the output voltage passes through zero and changes sign as the sensed component of water current passes through zero and reverses at the transducer. The phase-sensitive detector is not called upon to reject quadrature voltage or "transformer effect" voltage as is required in the conventional sinusoidal signal conditioning circuit as shown in FIG. 14 and, accordingly, the quadrature rejection capabilities of the phase-sensitive detector shown in FIG. 15 are not nearly as stringent as those shown in FIG. 14.

At this juncture, it is well to note that the sampling signal conditioning technique described in FIG. 15 has an especial added advantage with electromagnetic water current meters in that it can be made capable of rejecting undesirable power frequency spurious voltages (e.g. 60 Hz and harmonics thereof) which often times exist where water current measurement is desired, e.g. when flow measurement is made near an hydro-electric power plant. It is difficult to shield the sensing circuit on electromagnetic water current meters from these extraneous noises because its sensing electrodes face outward into the metered medium. The key to the signal conditioning's capability for power frequency noise rejection is to note from FIG. 16d that the frequency of sampling is double the frequency of the alternating magnetic induction, as shown in FIGS. 16f and/or 16g. As an explicit example, if the electromagnetic water current meter operates with a magnetic induction of 30 Hz, its sampling gate in this form of the invention is opened at a 60 Hz rate. We have already seen how a 30 Hz signal (i.e. our water current flow signal) is handled by this system so that there is ultimately an analog output voltage indication proportional to water current flow. A 60 Hz signal, however, is completely rejected for the following reasons. Since the sampling gate is opened once every one-sixtieth of a second, the sampling system samples an identical portion of the repetitive 60 Hz noise signal at each sample, and the sample-and-hold system therefore retains a constant, dc voltage at its output. The ensuing 30 Hz filter completely rejects this dc voltage, and by this means the system fully accepts the 30 Hz water flow signal, but completely rejects a 60 Hz spurious noise signal.

Consideration of the harmonics of 60 Hz shows that the system also fully rejects these spurious noises. Further consideration shows that similar complete rejection of 60 Hz and its harmonics is obtained if the sampling gate is operated at frequencies of 60 cps, 30 cps, 15 cps, etc. or in general is operated at the power line frequency or any subharmonic thereof. If the sample system is operated at these frequencies, we say that the system is synchronously rejecting power frequency spurious noise. At the same time, of course, the magnetic induction in the water current meter is alternated at a frequency which is half the frequency of the sampling system. In all cases the bank pass filter after the sample and hold has its center frequency at the magnetic induction frequency.

Best operation is obtained in the sampling gate is synchronously locked to the power line frequency (whether it be 60 Hz, 50 Hz, 25 Hz, etc.), or to a subharmonic thereof. Quite good rejection is obtained, however, provided the gate frequency is substantially closer to the aforedescribed synchronous rejection frequencies.

Figure 17:
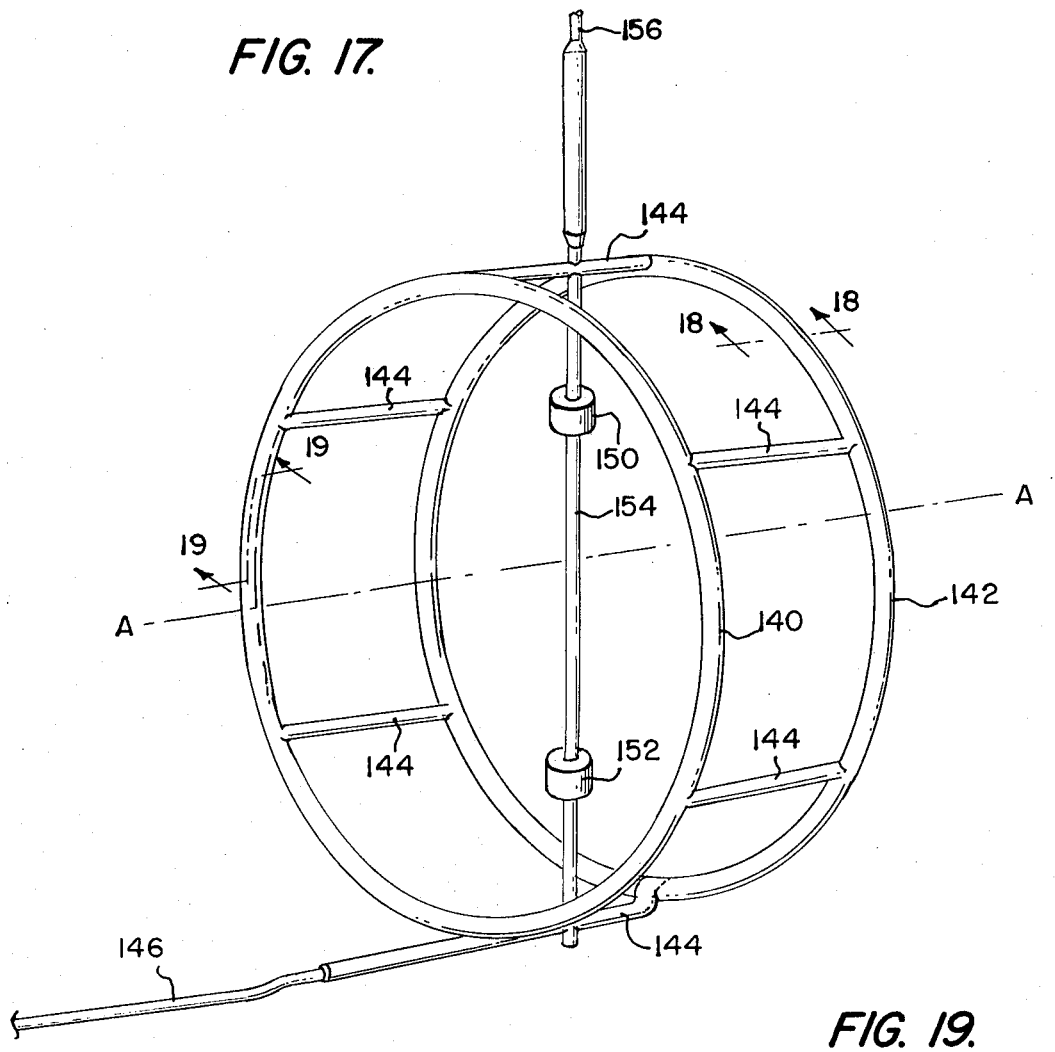
FIG. 17 illustrates a further modification of the invention.

Referring now to FIG. 17 of the drawings, yet another embodiment of the invention is illustrated. The transducer in this form of the invention comprises a body means including two spaced generally parallel coil means 140 and 142 interconnected by spaced cross members 144. The body means is symmetrical about longitudinally extending axis A—A. Each of the coil means is annular in configuration and lies in a plane, the two planes being disposed parallel with one another. The two coil means are connected to a common coil cable 146.

A pair of spaced detecting electrodes 150 and 152 are supported on a support member 154 formed of electrically non-conductive material and connected with a pair of cross members 144. The detecting electrodes are in turn connected with an electrode cable 156.

The detecting electrodes are supported within the confines of the coil means and lie in a plane which is parallel to the planes of the two coil means and perpendicular to the longitudinal axis of the body means.

The arrangement as shown in FIG. 17 produces a signal voltage which is proportional to the component of water velocity parallel to the plane of the coil means and perpendicular to a line connecting the two detecting electrodes. Here again, large voltages are necessary to energize the electromagnet and it is imperative that these large voltages be thoroughly electrically shielded from the metered water and from the detection circuitry in order to achieve an instrument with high accuracy and substantially zero base line variation.

Figure 18:
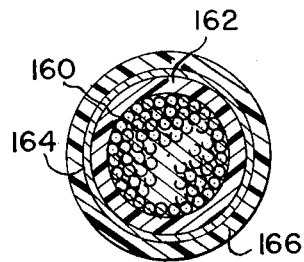
FIG. 18 is a sectional view taken substantially along line 18—18 of FIG. 17 looking in the direction of the arrows.

As seen in FIG. 18, each of the coil means includes a central coil winding 160 surrounded by a layer of insulating material such as fiberglass which in turn is surrounded by a layer 164 of electrically conductive material such as conductive silver paint. This conductive layer is in turn surrounded by a further layer 166 of electrical insulating material such as fiberglass.

Figure 19:
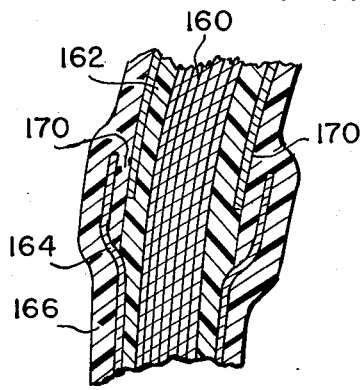
FIG. 19 is a sectional view taken substantially along lines 19—19 of FIG. 17 looking in the direction of the arrows.

If the entire surface of the coils were surrounded with a conductive layer of silver paint or the like this would constitute a very sizable short-circuited circuit loop which would dissipate considerable energy, or more seriously, produce some phase-shifted magnetic flux. It may be preferable to form this shield of a less conductive material such as carbon paint rather than silver paint. Another solution to the problem is illustrated in FIG. 19 wherein the conductive layer 164 is broken at one point to provide an overlapped break or gap 170 so as to prevent a short-circuited conductive loop. Instead of a simple break, an interleaved brake may be provided to maintain good electrical shielding capability.

What is claimed is:

1. An electromagnetic water current meter comprising body means formed of non-conductive material, a pair of electrically conductive detecting electrodes supported by said body means at opposite portions thereof, means within said body means and disposed between said electrodes for producing an alternating magnetic field and including an electromagnet, drive means for driving said electromagnet to produce an alternating magnetic field at a predetermined frequency wherein the magnetic field is driven to a finite value for a predetermined time interval during each half cycle thereof, and an electrical circuit connected with said detecting electrodes for measuring the electrical signal from said electrodes during a time delayed portion of each said time interval whereby undesired portions of the signal from said detecting electrodes due to transformer effect voltage are substantially eliminated, said electrical circuit including a single sample-and-hold circuit gated by said drive means and having an alternating current output, and means for processing said alternating current output to produce an analog output signal proportional to the peak-to-peak amplitude of said alternating current output including a band pass filter connected with the output of said sample-and-hold circuit.

2. Apparatus as defined in claim 1 wherein said means for producing an alternating magnetic field is surrounded by said body means, said body means being formed of waterproof material to prevent water from coming into contact with said means for producing the alternating magnetic field.

3. Apparatus as defined in claim 1 including a coating of electrically non-conductive anti-fouling material disposed on the outer surface of said body means.

4. Apparatus as defined in claim 1 wherein said detecting electrodes are disposed at the outer surface of said body means and are formed of an electrically conductive mixture of anti-foulant and carbon.

5. Apparatus as defined in claim 1 including a second pair of detecting electrodes supported by said body means at opposite portions of the body means.

6. Apparatus as defined in claim 5 wherein the electrodes of said two pairs of electrodes are disposed at 90° intervals from one another.

7. Apparatus as defined in claim 1 wherein said means for producing an alternating magnetic field includes an electromagnet having a coil and a core, said core being formed of substantially eddyless material to reduce eddy currents.

8. Apparatus as defined in claim 1 including shield means for electrically shielding said detecting electrodes from said means for producing the alternating magnetic field.

9. Apparatus as defined in claim 8 wherein said shield means comprises electrically conductive material disposed between said detecting electrodes and said means for producing the alternating magnetic field.

10. Apparatus as defined in claim 9 including lead means connected with said means for producing the alternating magnetic field, said shield means also including electrically conductive material around said lead means.

11. Apparatus as defined in claim 1 wherein said means for processing includes a phase-sensitive detector connected with the output of said band pass filter.

12. An electromagnetic water current meter comprising body means formed of non-conductive material, a pair of electrically conductive detecting electrodes supported by said body means at opposite portions thereof, means within said body means and disposed between said electrodes for producing an alternating magnetic field and including an electromagnet, drive means for driving said electromagnet to produce an alternating magnetic field at a predetermined frequency wherein the magnetic field is driven to a finite value for a predetermined time interval during each half cycle thereof, and an electrical circuit connected with said detecting electrodes for measuring the electrical signal from said electrodes during a time delayed portion of each said time interval whereby undesired portions of the signal from said detecting electrodes due to transformer effect voltage are substantially eliminated, said electrical circuit including a single sample-and-hold circuit gated by said drive means and having an alternating current output, and means for processing said alternating current output to produce an analog output signal proportional to the peak-to-peak amplitude of said alternating current output, the last recited means including a filter for eliminating dc components of said alternating current output.

13. Apparatus as defined in claim 12 including a second pair of detecting electrodes supported by said body means at opposite portions thereof.

14. Apparatus as defined in claim 13 wherein the electrodes of each of said pairs of electrodes are disposed at substantially 90° intervals to one another.

15. Apparatus as defined in claim 12 wherein said means for producing an alternating magnetic field includes a coil and a core, said core being of eddyless construction and being formed of ferrite material to reduce eddy currents.

16. Apparatus as defined in claim 12 including shield means for shielding said detecting electrodes from said means for producing the alternating magnetic field.

17. Apparatus as defined in claim 16 wherein said shield means comprises electrically conductive material disposed between said detecting electrodes and said means for producing the alternating magnetic field.

18. Apparatus as defined in claim 17 including lead means connected with said means for producing the alternating magnetic field, said shield means including electrically conductive material surrounding said lead means.

* * * * *